United States Patent
Shamshoum et al.

(10) Patent No.: US 6,855,782 B2
(45) Date of Patent: Feb. 15, 2005

(54) PROCESS FOR PRODUCING STEREOSPECIFIC POLYMERS

(75) Inventors: Edwar S. Shamshoum, Houston, TX (US); Margarito Lopez, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 403 days.

(21) Appl. No.: 10/114,185

(22) Filed: Apr. 2, 2002

(65) Prior Publication Data

US 2002/0147105 A1 Oct. 10, 2002

Related U.S. Application Data

(62) Division of application No. 09/273,819, filed on Mar. 22, 1999, now Pat. No. 6,432,860.

(51) Int. Cl.$^7$ .............................. C08F 4/642; C08F 4/02; C08F 110/06
(52) U.S. Cl. ........................ 526/129; 526/160; 526/346; 526/351; 526/943
(58) Field of Search ................................ 526/129, 160, 526/351; 502/103, 117

(56) References Cited

U.S. PATENT DOCUMENTS 5,968,864 A * 10/1999 Shamshoum et al. ....... 502/104

* cited by examiner

Primary Examiner—Roberto Rabago
(74) Attorney, Agent, or Firm—William D. Jackson

(57) ABSTRACT

Supported stereospecific catalysts and processes for the stereotactic propagation of a polymer chain derived from ethylenically unsaturated monomers which contain three or more carbon atoms or which are substituted vinyl compounds, such as styrene and vinyl chloride. One application is the stereospecific propagation of $C_3$–$C_4$ alpha olefins, particularly the polymerization of propylene to produce syndiotactic polypropylene over a supported metallocene catalyst comprising a stereospecific metallocene catalyst component incorporating a metallocene ligand structure having two sterically dissimilar cyclopentadienyl ring structures coordinated with the central transition metal atom. Both of the cyclopentadienyl groups are in a relationship with one another by virtue of bridge or substituent groups, which provide a stereorigid relationship relative to the coordinating transition metal atom to prevent rotation of said ring structures. The metallocene catalyst component and a co-catalyst component, an alumoxane or an alkyl aluminum, are supported on a particulate silica support comprising spheroidal silica particles having an average diameter within the range of 5–40 microns and an average effective pore size within the range of 50–350 angstroms. The particulate silica support contains at least 50 wt. % of the supported catalyst component within the pore volume of the silica support.

18 Claims, 7 Drawing Sheets

PROCESS FOR PRODUCING STEREOSPECIFIC POLYMERS

This application is a division of application Ser. No. 09/273,819, filed Mar. 22, 1999, now U.S. Pat. No. 6,432,860.

This invention relates to supported metallocene catalysts useful in the production of stereospecific polymers from ethylenically unsaturated compounds and, more particularly, to such catalysts incorporating silica supports and their use.

FIELD OF THE INVENTION

BACKGROUND OF THE INVENTION

Numerous catalyst systems for use in the polymerization of ethylenically unsaturated monomers are based upon metallocenes. Metallocenes can be characterized generally as coordination compounds incorporating one or more cyclopentadienyl groups (which may be substituted or unsubstituted) coordinated with a transition metal. Various types of metallocenes are known in the art. They include bicyclic coordination compounds of the general formula:

$$(Cp)_2MeQn \quad (1)$$

characterized by the isospecific metallocenes as described below and dicyclopentadienyl compounds of the general formula:

$$CpCp'MeQn \quad (2)$$

characterized by the syndiospecific metallocenes described below. In the aforementioned formulas the Me denotes a transition metal and Cp and Cp' each denote a cyclopentadienyl group which can be either substituted or unsubstituted with Cp' being different from Cp, Q is an alkyl or other hydrocarbyl or a halo group and n is a number within the range of 1-3. The cyclopentadienyl groups are in a stereorigid relationship normally provided by a bridged structure between the metallocene rings (not shown in Formulas (1) and (2) above) although stereorigidity can be provided through substituent groups which result in steric hindrance, as described, for example, in U.S. Pat. No. 5,243,002 to Razavi. Also, while bridged metallocenes normally incorporate two cyclopentadienyl groups (or substituted cyclopentadienyl groups), bridged metallocenes incorporating a single cyclopentadienyl group which is bridged to a heteroatom aromatic group (both being coordinated with a transition metal) are also known in the art. For example, U.S. Pat. No. 5,026,798 to Canich discloses dimethylsilyl-bridged cyclopentadienyl—anilino or other heteroatom ligand structures with coordination to the transition metal being provided through the nitrogen atom of the anilino group.

As noted previously, isospecific and syndiospecific metallocene catalysts are useful in the polymerization of stereospecific propagation of monomers. Stereospecific structural relationships of syndiotacticity and isotacticity may be involved in the formation of stereoregular polymers from various monomers. Stereospecific propagation may be applied in the polymerization of ethylenically unsaturated monomers such as $C_3+$ alpha olefins, 1-dienes such as 1,3-butadiene, substituted vinyl compounds such as vinyl aromatics, e.g., styrene or vinyl chloride, vinyl chloride, vinyl ethers such as alkyl vinyl ethers, e.g., isobutyl vinyl ether, or even aryl vinyl ethers. Stereospecific polymer propagation is probably of most significance in the production of polypropylene of isotactic or syndiotactic structure.

The structure of isotactic polypropylene can be described as one having the methyl groups attached to the tertiary carbon atoms of successive monomeric units falling on the same side of a hypothetical plane through the main chain of the polymer, e.g., the methyl groups are all above or below the plane. Using the Fischer projection formula, the stereochemical sequence of isotactic polypropylene is described as follows:

(3)

In Formula 3 each vertical segment indicates a methyl group on the same side of the polymer backbone. Another way of describing the structure is through the use of NMR. Bovey's NMR nomenclature for an isotactic pentad as shown above is ... mmmm ... with each "m" representing a "meso" dyad, or successive pairs of methyl groups on the same said of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the chain lie on alternate sides of the plane of the polymer. Syndiotactic polypropylene in using the Fisher projection formula can be indicated by racemic dyads with the syndiotactic pentad rrrr shown as follows:

(4)

Here, the vertical segments again indicate methyl groups in the case of syndiotactic polypropylene, or other terminal groups, e.g. chloride, in the case of syndiotactic polyvinyl chloride, or phenyl groups in the case of syndiotactic polystyrene.

Syndiotactic polymers are semi-crystalline and, like the isotactic polymers, are insoluble in xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product.

Yet another polymer configuration which has both isotactic and atactic features is exemplified by hemi-isotactic polypropylene. Hemi-isotactic polypropylene is characterized by every other methyl group being on the same side of the polymer with the remaining methyl groups randomly being on the same side or on the opposite side of the polymer backbone. Hemi-isotactic polypropylene can be characterized by the following Fisher projection formula in which, as indicated by the broken lines, alternate methyl groups have random stearic configurations.

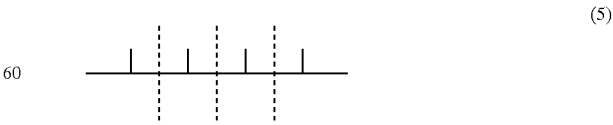

(5)

Thus, as shown in Structure 5, the methyl groups indicated by the solid lines are in a mesa relationship with one another, with the alternating methyl groups indicated by the broken lines being randomly configured. Hemi-isotactic polypropylene, while having a semi-ordered structure, is primarily non-crystalline because of the disorder of the alternate methene units.

In most cases, the preferred polymer configuration will be a dominantly isotactic or syndiotactic polymer with very little atactic polymer. Catalysts that produce isotactic polyolefins are disclosed in U.S. Pat. Nos. 4,794,096 and 4,975,403. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

$$R''(C_5(R')_4)_2HfQp \qquad (6)$$

In formula (7), $(C_5(R')_4)$ is a cyclopentadienyl or substituted cyclopentadienyl group, R' is independently hydrogen or a hydrocarbyl radical having 1–20 carbon atoms, and R" is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

Catalysts that produce syndiotactic polypropylene or other syndiotactic polyolefins and methods for the preparation of such catalysts are disclosed in the aforementioned U.S. Pat. No. 4,892,851. These catalysts are also bridged stereorigid metallocene catalysts, but, in this case, the catalysts have a structural bridge extending between dissimilar cyclopentadienyl groups and may be characterized by the formula:

$$R''(CpR_n)(CpR'_m)MeQ_k \qquad (7)$$

In formula (7), Cp represents a cyclopentadienyl or substituted cyclopentadienyl ring, and R and R' represent hydrocarbyl radicals having 1–20 carbon atoms. R" is a structural bridge between the rings imparting stereorigidity to the catalyst. Me represents a transition metal, and Q a hydrocarbyl radical or halogen. $R'_m$ is selected so that $(CpR'_m)$ is a sterically different substituted cyclopentadienyl ring that $(CpR_n)$. In formula (8) n varies from 0–4 (0 designating no hydrocarbyl groups, i.e., an unsubstituted cyclopentadienyl ring), m varies from 1–4, and k is from 0–3. The sterically different cyclopentadienyl rings produce a predominantly syndiotactic polymer rather than an isotactic polymer.

Specifically disclosed in U.S. Pat. No. 4,892,851, are bridged metallocene ligands having a dissimilar cyclopentadienyl group resulting from the reaction of 6,6 dimethyl fulvene with a substituted cyclopentadiene, fluorene, to produce a ligand characterized by an isopropylidene bridge structure. Preferably, this ligand structure is characterized as having bilateral symmetry such as indicated by the isopropylidene(cyclopentadienyl fluorenyl) structure as shown below:

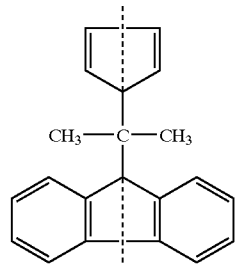

(8)

As indicated by Formula (8), the bilateral symmetry of the ligand structure is indicated by the balanced orientation about the broken line representing a plane of symmetry extending generally through the bridge structure and the transition metal atom.

The foregoing structure may be contrasted with a metallocene which lacks bilateral symmetry which can be used in the production of hemi-isotactic polypropylene as described in the U.S. Pat. No. 5,036,034 to Ewen. An example of a compound indicating a lack of bilateral symmetry is isopropylidene (3-methyl cyclopentadienyl-1 fluorenyl) zirconium dichloride having the ligand structure shown by the following formula:

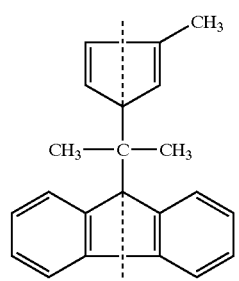

(9)

As explained in more detail in the aforementioned Ewen '034 patent, the lack of bilateral symmetry is indicated by the right side of the structure relative to the broken line being different from the left side because of the methyl group substituted at the distal position on the cyclopentadienyl group.

The various metallocene structures as described above can be used either as so-called "neutral metallocenes" in which case an alumoxane, such as methylalumoxane, is used as a co-catalyst, or they can be employed as so-called "cationic metallocenes" which incorporate a stable non-coordinating anion and normally do not require the use of an alumoxane. Syndiospecific cationic metallocenes are disclosed for example in U.S. Pat. No. 5,243,002 to Razavi. As disclosed there, the metallocene cation is characterized by the cationic metallocene ligand having sterically dissimilar ring structures which are joined to a positively-charged coordinating transition metal atom. The metallocene cation is associated with a stable non-coordinating counter-anion.

The aforementioned Razavi '002 patent also discloses the establishment of a stereorigid relationship imparted by a sterically-hindered relationship between substituted cyclopentadienyl rings which prevent rotation of the ring structures about their coordination axis. Alternatively, the cyclopentadienyl groups may be highly substituted such that a relatively low kinetic energy state is induced by the substituents in order to prevent rotation rings about their coordination axis at the temperature of the catalyst. Such cationic metallocenes also may, of course, like their neutral counterparts, be characterized by a stereorigid relationship imparted by means of a structural bridge between the cyclopentadienyl groups.

U.S. Pat. No. 5,225,500 to Elder et al discloses stereorigid cationic metallocenes, including, inter alia, bridged metallocene catalysts useful for the production of syndiotactic polymers. The bridged metallocene catalysts of U.S. Pat. No. 5,225,500 comprise an unbalanced metallocene cation and a stable, non-coordinating counteranion for the metallocene cation. The metallocene cation is characterized by a cationic metallocene ligand having sterically dissimilar ring structures joined to a positively charged coordinating transition metal atom. The dissimilar cyclopentadienyl rings, at least one of which is substituted, are both in a stereorigid relationship relative to the coordinating metallocene of the metal atom catalyst, and, as noted previously, the stereorigid relationship may be imparted by means of a structural bridge between the dissimilar cyclopentadienyl rings.

While metallocene catalysts are often used as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described in the Welborn '432 patent, the support may be any support such as talc, an inorganic oxide, or a resinous support material such as a polyolefin. Specific inorganic oxides include silica and alumina, used alone or in combination with other inorganic oxides such as magnesia, titania, zirconia and the like. Non-metallocene transition metal compounds, such as titanium tetrachloride, are also incorporated into the supported catalyst component. The inorganic oxides used as support are characterized as having an average particle size ranging from 30–600 microns, preferably 30–100 microns, a surface area of 50–1,000 square meters per gram, preferably 100–400 square meters per gram, a pore volume of 0.5–3.5 cc/g, preferably about 0.5–2 cc/g. Generally, the particle size, surface area, pore volume, and number of surface hydroxyl groups are said to be not critical to the Welborn procedure. Specifically disclosed in Welborn is a catalyst in which bis(cyclopentadienyl)zirconium dichloride (unbridged metallocene) is supported on a high surface area silica dehydrated in dry nitrogen at 600° C. and characterized as Davison 952. The Welborn '561 patent discloses a heterogeneous catalyst which is formed by the reaction of a metallocene and an alumoxane in combination with the support material. The support in Welborn '561 is described similarly as the support in the Welborn '432 patent.

A catalyst system embodying both a homogeneous metallocene component and a heterogeneous component, which may be a "conventional" supported Ziegler-Natta catalyst, e.g. a supported titanium tetrachloride, is disclosed in U.S. Pat. No. 5,242,876 to Shamshoum et al.

Various other catalyst systems involving supported metallocene catalysts are disclosed in U.S. Pat. No. 5,308,811 to Suga et al and U.S. Pat. No. 5,444,134 to Matsumoto. In both patents the supports are characterized as various high surface area inorganic oxides or clay-like materials. In the patent to Suga et al, the support materials are characterized as clay minerals, ion-exchanged layered compounds, diatomaceous earth, silicates, or zeolites. As explained in Suga, the high surface area support materials should have volumes of pores having radii of at least 20 angstroms. Specifically disclosed and preferred in Suga are clay and clay minerals such as montmorillonite. The catalyst components in Suga are prepared by mixing the support material, the metallocene, and an organoaluminum compound such as triethylaluminum, trimethylaluminum, various alkylaluminum chlorides, alkoxides, or hydrides or an alumoxane such as methylalumoxane, ethylalumoxane, or the like. The three components may be mixed together in any order, or they may be simultaneously contacted. The patent to Matsumoto similarly discloses a supported catalyst in which the support may be provided by inorganic oxide carriers such as $SiO_2$, $Al_2O_3$, MgO, $ZrO_2$, $TiO_2$, $Fe_2O_3$, $B_2O_2$, CaO, ZnO, BaO, $ThO_2$ and mixtures thereof, such as silica alumina, zeolite, ferrite, and glass fibers. Other carriers include $MgCl_2$, $Mg(O\text{-}Et)_2$, and polymers such as polystyrene, polyethylene, polypropylene, substituted polystyrene and polyarylate, starches, and carbon. The carrier has a surface area of 1–1000 $m^2/g$, preferably 50–500 $m^2/g$, a pore volume of 0.1–5 $cm^3g$, preferably 0.3–3 $cm^3/g$, and a particle size of 20–100 microns.

Of the various inorganic oxides used as supports, silica, in one form or another, is widely disclosed as a support material for metallocene catalysts. Silica, characterized as Davison D-948 or Davison D-952, appears as a conventional metallocene support. For example, U.S. Pat. No. 5,466,649 to Jejelowo discloses the use of dehydrated Davison D-948 silica as a support for various unbridged metallocenes used in conjunction with supported co-catalysts. U.S. Pat. No. 5,498,581 to Welch et al discloses silica for use as a support for either bridged or unbridged metallocenes in which the silica is treated with carbon monoxide, water, and hydroxyl groups to inactive species. Specifically disclosed is the silica, Davison D-948, having an average particle size of 50 microns. Other silica-based supports are disclosed in U.S. Pat. No. 5,281,679 to Jejelowo, U.S. Pat. No. 5,238,892 to Chang, and U.S. Pat. No. 5,399,636 to Alt. The Chang and Jejelowa patent disclose the use of a silica support identified as Davison D-948, which is characterized as a amorphous silica gel containing about 9.7 wt. % water. As described in the Chang and Jejelowa patents, alumoxane is formed directly on the surface of the silica gel by direct reaction of an alkyl aluminum with silica gel which is undehydrated so as to ensure the conversion of the quantity of the alkyl aluminum to an alumoxane that has a high degree of oligomerization. The water-impregnated gel is characterized as having a surface range of 10–700 $m^2/g$, a pore volume of about 0.5–3 cc/g, and an absorbed water content of from about 10–50 wt. % in the case of the Jejelowa patent and about 6–20 wt. % in the case of the Chang patent. The average particle size for the silica is described in Chang to be from 0.3–100 microns and in Jejelowa from about 10–100 microns. After the alumoxane silica gel component has been formed, the metallocene may be added to the wet slurry.

SUMMARY OF THE INVENTION

In accordance with the present invention, there are provided supported stereospecific catalysts and processes for the stereotactic propagation of a polymer chain derived from ethylenically unsaturated monomers which contain three or more carbon atoms or which are substituted vinyl compounds, such as styrene and vinyl chloride. The preferred application of the present invention is in the stereospecific propagation of $C_3$-$C_4$ alpha olefins, particularly the polymerization of propylene to produce syndiotactic polypropylene. In carrying out the present invention, there is provided a supported metallocene catalyst comprising a stereospecific metallocene catalyst component and a co-catalyst component comprising at least one of an alkyl alumoxane and an alkylaluminum compound. The metallocene catalyst compound incorporates a metallocene ligand structure having two sterically dissimilar cyclopentadienyl ring structures coordinated with the central transition metal atom. At least one of the cyclopentadienyl ring structures is a substituted cyclopentadienyl group which provides an orientation with respect to said transition metal atom which is sterically different from the orientation of the other cyclopentadienyl group. Both of the cyclopentadienyl groups are in a relationship with one another by virtue of bridge or substituent groups, which provide a stereorigid relationship relative to the coordinating transition metal atom to prevent rotation of said ring structures. Both the metallocene catalyst component and the co-catalyst component are supported on a particulate silica support comprising spheroidal silica particles having an average diameter within the range of 5–40 microns and an average effective pore size within the range of 50–350 angstroms. The particulate silica support contains at least 50 wt. % of the supported catalyst component within the pore volume of the silica support. This supported catalyst is contacted in a polymerization reaction zone with an ethylenically unsaturated monomer which contains 3 or more carbon atoms or which is a substituted vinyl compound under polymerization conditions to produce syndiospecific polymerization of the monomer.

In a preferred embodiment of the invention, a supported metallocene catalyst incorporates a particulate silica support having an average diameter and effective pore size as described previously. The particulate spheroidal particles have at least 50% of the surface area thereof contained within the pore volume of the support particles. A stereospecific metallocene is supported on the silica support particles. In one application of the invention, the metallocene is an unbalanced metallocene having a ligand structure in which stereorigidity is imparted by means of a structural bridge extending between dissimilar cyclopentadienyl groups. The metallocene ligand structure has a kinetic diameter which is substantially less than the average pore size of the silica. The metallocene is prefentially is carried within the interior pore volume of the silica particles to provide at least 50 wt. % of the polymerization sites provided on the transitional metal atom within the interior pore volume of the support.

DETAILED DESCRIPTION OF THE INVENTION

Figure 1A:
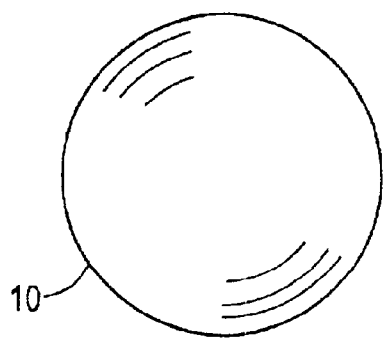
FIG. 1A is an elevational view of an idealized depiction of a solid spheroidal catalyst particle which can be used in carrying out the present invention.

The present invention involves processes for supported stereospecific metallocenes which may be neutral or cationic, and which are effective in stereospecific polymer propagation, especially syndiotactic polymer propagation, to provide polymer structure having reduced gel imperfections. As indicated previously, the metallocene-type catalysts, like the more traditional Ziegler-Natta catalysts, can be supported on various inorganic supports. When supporting traditional Ziegler-Natta-type catalysts, such as zirconium, hafnium, and titanium tetrahalides on crystalline materials, such as magnesium dichloride, it is conventional to "activate" the support material to provide particles of a large surface area on which the transition metal sites are exposed for the polymerization reaction in which the monomer units are incorporated into the growing polymer chain. Similar thinking has dominated the use of supports for metallocene catalysts. Thus, high surface area materials are thought to be desirable and where microporous materials are employed, silica being the principal one of such material, relatively large pore spaces in relationship to the kinetic size of the metallocene ligand are thought to be desirable. Thus, as explained in the aforementioned patent to Suga et al, the pore volume of the support material should be provided by pores having a radii of at least 20 angstroms. Since all things being equal, a higher pore volume correlates with a lower surface area, the traditional silca supports are able to provide relatively high surface areas with acceptable pore volumes because of the irregular angular nature of the silica particles. As described in greater detail below, such silica particles can be characterized as highly irregular polygons with many irregular surface facets and acute angles between intersecting surfaces.

The present invention relates to silica-supported stereospecific metallocenes catalysts which result in a very substantial reduction in imperfections in the resulting polymer product obtained with the supported metallocene catalyst. The silica support employed in the present invention is characterized as a silica having generally spheroidal particles with a relatively small average diameter and a relatively high pore volume of about 1 ml./gr., preferably 1.2 ml./gr and more preferably within the range of 1.3–1.5 ml./gr.

The preferred form of silica support is characterized by generally spheroidal silica particles having generally axial depressions, sometimes extending completely through the particle, to provide a "donut" or toroidal configuration to the particle. While solid spheroidal particles provide a substantially-enhanced film configuration having reduced imperfections, similar spheroidal-shaped particles with the "donut" or toroidal configuration provide a marked decrease in imperfections with respect to those polymers produced by catalysts supported on the smooth spherical-type silica particles.

The particulate silica support employed in the present invention comprises spheroidal silica particles having an average diameter within the range of 5–40 microns and, more preferably, within the range of about 10–40 microns. The metallocene catalyst is primarily supported within the pore surface area of the silica, as contrasted with the external surface area, with the amount of metallocene supported externally of the silica particle accounting for a minor fraction, usually no more than 10 wt. % of the total metallocene found on the silica support. Stated otherwise, a major fraction of more than 50% and preferably at least 90 wt. % of the metallocene is contained within the pore volume of the silica support. An improved polymer characterized in terms of reduced gel defects is observed for catalysts supported on relatively high surface areas, small particle size spherical particles having an average particle size of about 10 to 25 microns. While these solid spheres result in substantially better polymers than those produced by metallocene supported on the more conventional, irregular particulate silica, much better results are obtained employing silica supports of the toroidal configuration. This substantially-reduced number of gel defects is accomplished not withstanding that the toroidal silica has a somewhat larger average particle size than the solid spheroidal silica While Applicants' invention is not to be limited by theory, it is postulated that these spheroidal silica particles, particularly the toroidal particles, become highly fractured during the polymerization procedure. The fracturing of the spheroidal silica particles not only continuously exposes more transition metal sites to the monomer insertion mechanism during the polymerization process, it ultimately reduces the silica particles to a size such that they do not result in significant numbers of gel defects. Thus, the toroidal silica particles, while larger than the more perfectly formed spheroidal silica particles, are believed ultimately to fracture to a size of about five microns or less, usually about three microns or less, with an attendant highly significant reduction in gel imperfections. While the toroidal configurations are thus preferred, as shown by the experimental data presented hereinafter, the relatively solid spheroidal particles, which more nearly approach being perfect spheres, still result in substantial reduction in gel imperfections when compared with polymers prepared using the more conventional irregular silica supports.

The metallocenes employed in the present invention may be isospecific or syndiospecific catalysts, as described previously, but preferably are syndiospecific catalysts, and the invention will be described with regard to formation of syndiotactic polyolefins, specifically syndiotactic polypropylene. The term "metallocene," as used herein and in accordance with normal art usage, denotes an organometallic coordination compound in which two cyclo-$C_5$ ligands (cyclopentadienyl or substituted cyclopentadienyl rings) are bonded to a central or "sandwiched" metal atom which may be provided by a transition metal halide, alkyl, alkoxy, alkoxy halide or the like. Such structures are sometimes referred to as "molecular sandwiches: since the cyclo-$C_5$ ligands are oriented above or below the plane of the central coordinated metal atom. The metallocene catalysts which are supported in accordance with the present invention may be neutral or they may be cationic. By the term "cationic metallocene" is meant a metallocene in which the central coordinated metal atom carries a positive charge, that is, the metallocene complex is a cation associated with a stable anion. The neutral or cationic metallocenes employed in accordance with the present invention are stereorigid. Preferably, stereorigidity is imported to the ligand structure by virtue of a chemical bridge extending between the cyclopentadienyl (or substituted cyclopentadienyl) rings.

As noted previously, U.S. Pat. No. 4,892,851 discloses the preparation of syndiotactic polypropylene or other polyolefins through the use of bridged stereorigid metallocene catalysts. The aforementioned U.S. Pat. No. 5,225,500 discloses stereorigid metallocene catalysts, including those in which stereorigidity is imparted by a bridge structure, in which a neutral metallocene is ionized to provide a stable cationic catalyst. Neutral metallocenes may also be converted to the cationic form following procedures of the type disclosed in the aforementioned U.S. Pat. Nos. 5,243,002 and 5,205,500 and also in European Patents 277,003 and 277,004 to Turner, and further by a process employing a triphenylcarbenium boronate as discussed in greater detail in U.S. Pat. No. 5,387,568 to Ewen et al or a triphenylcarbenium aluminate as disclosed in U.S. patent application Ser. No. 893,522 filed Jun. 4, 1992, by Elder et al. now U.S. Pat. No. 5,763,549. In the bridged metallocene catalysts employed in the present invention, the cyclopentadienyl groups may be the same if they are to be used for isotactic polymer propagation, or different if they are to be used for syndiotactic polymer propagation.

As noted previously, a preferred application of the present invention is in the use of supported syndiospecific catalysts having a stereorigid bridge structure extending between dissimilar cyclopentadienyl rings. Such syndiospecific metallocenes may be characterized by the previously described Formula (7):

$$R''(CpR_n)(CpR'_m)MeQ_k \qquad (7)$$

In Formula (7), R and R' are selected such that $CpR'_m$ is a sterically different ring than $CpR_n$. Isospecific catalysts employed in accordance with the present invention may also be characterized by Formula (7), with the proviso that the two cyclopentadienyl groups, which may be substituted or unsubstituted, are chemically the same, that is, $CpR'_m$ is the same as $CpR_n$ and m and n may both vary from 0 to 4. Such isospecific catalysts can be characterized by the formula:

$$R''(C_5R'_4)_2MQ_k \qquad (10)$$

corresponding to Formula (6) above except that M is a transition metal not limited to hafnium, and more specifically by the formula:

$$R''(Ind)_2MQ_k \qquad (11)$$

wherein Ind is an indenyl or substituted indenyl group in a racemic configuration.

As noted previously, the stereorigid metallocene catalysts employed in the present invention may be neutral or cationic metallocenes. The cationic metallocenes correspond to the structures depicted by Formulas (7) and (10) with the exception that k is an integer from 0 to 2, rather than the transition metal being possibly trisubstituted, as in the case of the neutral metallocenes. Such cationic metallocene catalysts may be characterized by the following formula:

$$[R''CpR_n)(CpR'_m)MeQ_k]^+P^- \qquad (12)$$

In Formula (12), Cp, R, R', M, m, and n are as described previously, k is a number from 0 to 2, and P is a stable noncoordinating counter anion. The cationic catalysts of Formula (12) may be prepared from the corresponding neutral metallocenes using procedures as described above.

The counter anion indicated by P in Formula (12) is a compatible noncoordinating anion which may be of the type described in the aforementioned Elder et al and Razavi U.S. patents or the Turner European patents. The anion P either does not coordinate with the metallocene cation or is only weakly coordinated to the cation, thereby remaining sufficiently liable to be displaced by a neutral Lewis base. As described in the Turner patents, the term "compatible noncoordinating anion" identifies an anion which, when functioning as a stabilizing anion in the metallocene catalyst system, does not transfer an anionic substituent or fragment thereof to the cation to form a neutral metallocene and boron byproduct or other neutral metal or metalloid byproduct, as the case may be. Suitable noncoordinating anions include: $[W(PhF_5)]$—, $[Mo(PhF_5)]$— (wherein $PhF_5$ is pentafluoryl phenyl), $[ClO_4]$—, $[SbR_6]$—, and $[AlR_4]$— (wherein each R is independently, Cl, a $C_1$–$C_5$alkyl group, preferably, a methyl group, an aryl group, e.g., a phenyl or substituted phenyl group, or a fluorinated aryl group. For a further description of compatible noncoordinating anions and their associated cations which may be employed in the present invention, reference is made to U.S. Pat. Nos. 5,225,500 and 5,243,002, 5,387,568, EPO Patent Nos. 277,003 and 277,004, and U.S. patent application Ser. No. 893,522, now U.S. Pat. No. 5,763,549 the entire disclosures of which are incorporated herein by reference.

The silica-supported bridged metallocene catalysts of the present invention may be isospecific or syndiospecific, as discussed previously. The bridge configuration of the R" structural bridge is controlled by the terminal carbon substituents of the substituted fulvene. For example, where the fulvene reactant is 6,6 dimethyl fulvene, the structural bridge will be a $C_3$ alkylene group, commonly referred to as propylidene. The use of 6,6 methyl, ethyl fulvene will result in a $C_4$ structural bridge, and the use of 6,6 diethyl fulvene as a reactant will result in a $C_5$ structural bridge. The use of 6,6 diphenyl fulvene will result in a diphenyl methylene bridge. Where the bridge is a hydrocarbyl group, it is preferably selected from the group consisting of alkyl radicals having 3–6 carbon atoms, more preferably, 3–5 carbon atoms. Examples of alkyl bridges include propyl, butyl, and pentyl bridges which may be substituted or unsubstituted. M in Formula (12), preferably, is a Group 4 or 5 metal, and more preferably, a Group 4 metal, specifically titanium, zirconium, or hafnium. Vanadium is the most suitable of the Group 5 metals. Q will usually be a methyl or ethyl group or chlorine.

Where the present invention is employed in the production of syndiotactic polymers, the cyclopentadienyl and substituted fulvene reactants are chosen so that the resulting syndiospecific catalysts exhibit bilateral symmetry of the metallocene ligands when viewed as planar projections of the cyclopentadienyl groups. By the term "bilateral symmetry," as used herein, it is meant the symmetry of the ligand as viewed through the axes of the substituted or unsubstituted Cp groups, as shown above by Formula (8). For example, the reaction of fluorene with 6,6-dimethyl fulvene produces the isopropylidene (cyclopentadienyl-1-fluorenyl) ligand which exhibits such bilateral symmetry. However, the similar reaction carried out with a ring substituted fulvene, such as 3-alkyl, 6,6-dimethyl fulvene, would result in a corresponding structure, but with the cyclopentadienyl group substituted at the three position. This structure would not exhibit bilateral symmetry as shown above by Formula (9). The ligand with two identical substituents at the 3 and 4 positions on the cyclopentadienyl group would have bilateral symmetry.

Usually, in the metallocenes employed in the present invention, Me is titanium, zirconium, hafnium, or vanadium; Q is, preferably, a methyl or halogen, more preferably chorine; and k, preferably, is 2 for neutral metallocenes, and 1 for cationic metallocenes, but may vary with the valence of the metal atom. Exemplary hydrocarbyl radicals include methyl, ethyl, propyl, isopropyl, butyl, isobutyl, amyl, isoamyl, hexyl, heptyl, octyl, nonyl, decyl, cetyl, phenyl, and the like. Other hydrocarbyl radicals include other alkyl, aryl, alkenyl, alkylaryl, or arylalkyl radicals. Further, Rn and R'm may comprise hydrocarbyl radicals attached to a single carbon atom in the Cp ring, as well as radicals that are bonded to two carbon atoms in the ring as in the case of a fluorenyl. Neutral metallocenes may be converted to the cationic state following procedures as described previously. Exemplary neutral syndiospecific metallocenes which may be employed in the present invention are isobutylidene (cyclopentadienyl-1-fluorenyl), zirconium dimethyl, isopentylidene (cyclopentadienyl-1-fluorenyl)zirconium dimethyl, isopropylidene(indenyl) (cyclopentadienyl) zirconium dimethyl, isopropylidene(cyclopentadienyl-1-fluorenyl) zirconium dimethyl, diphenyl methylene(cyclopentadienyl-1-fluorenyl)zirconium dimethyl, and the corresponding dichlorides or methylchlorides.

Examples of isospecific neutral metallocenes which can be employed in accordance with the present invention include isopropylidene bis-(2,3 dimethylcyclopentadienyl) zirconium dimethyl, isopropylidene his (tetramethylcyclopentadienyl) zirconium dimethyl, and isopropylidene bis (2,4 dimethylcyclopentadienyl) zirconium dimethyl, ethylene bis(2-methyl)zirconium dimethyl and the corresponding dichlorides. Further neutral metallocenes include ethylene bis(2-methyl indenyl) zirconium dichloride, dimethyl silyl bis(2-methyl indenyl) zirconium dichloride, diphenyl silyl bis(2-methyl indenyl) zirconium dichloride, diphenyl silyl bis(2-methyl, 4-phenyl-indenyl) zirconium dichloride, and diethyl silyl bis(2-methyl, 4-phenyl indenyl) zirconium dichloride. Other corresponding metallocenes, especially the corresponding hafnium and titanium metallocenes, can also be employed in accordance with the present invention to produce syndiospecific or isospecific catalysts. Similarly, other metallocene dialkyls, for example, such as the zirconium or hafnium diethyls and other dihalides, may also be made following the present invention, but, as a practical matter, the neutral metallocenes will be in the form of dimethyl or dichloride compounds, and the metallocenes will usually be in the form of the chlorides.

Figure 1B:
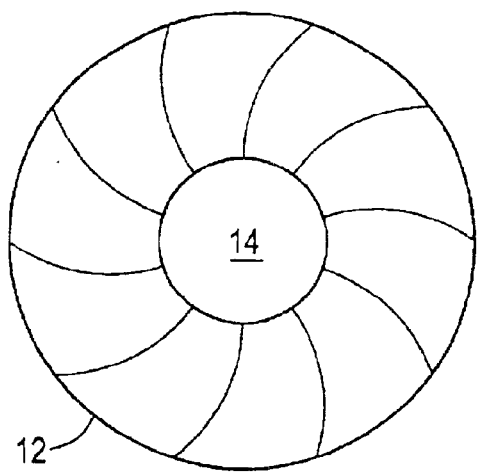
FIG. 1B is a side elevational view showing an idealized depiction of another form of a generally spherical catalyst particle which can be employed in carrying out the present invention.
Figure 1C:
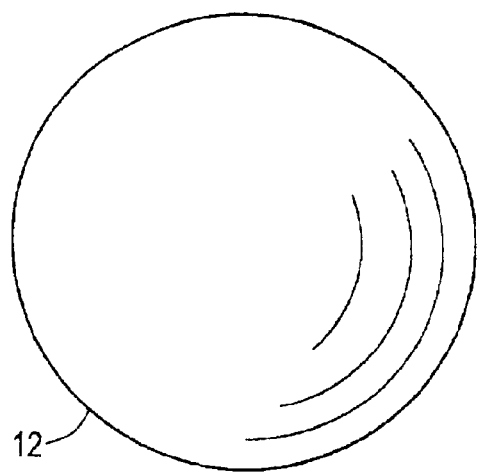
FIG. 1C is a transverse side elevational view of the catalyst particle of FIG. 1B.
Figure 1D:
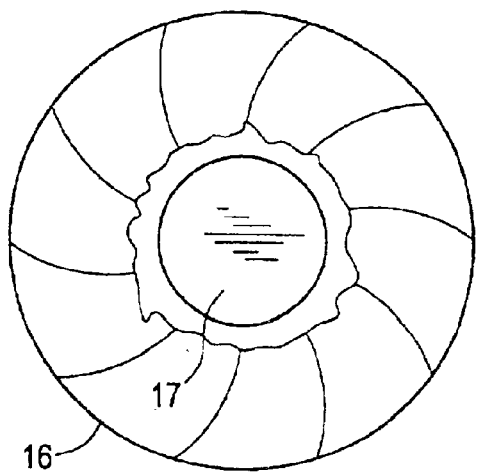
FIG. 1D is a side elevational view of an idealized depiction of a modified form of a catalyst particle corresponding to the catalyst particle of FIGS. 1B and 1C.

The silica particles of a spheroidal configuration which can be employed in caning out the present invention are shown schematically in FIGS. 1A, 1B, 1C, and 1D. FIG. 1A illustrates an idealized depiction of a solid spheroidal catalyst particle 10 corresponding to the high surface area catalyst identified below as Catalyst A. This catalyst has a relatively small average particle size and a relatively high surface area per gram in comparison to the somewhat larger particle size, toroidal configuration, as illustrated by FIGS. 1B and 1C. As shown in FIG. 1B, the generally spherical silica particle 12 is characterized by a central bore 14 so that the silica particle is of a spherical annular configuration. When viewed from the front elevation of FIG. 1B, the silica particle is generally shown to resemble a donut and, hence, the toroidal configuration. As shown in FIG. 1C, when viewed from a side elevation, the central bore is not apparent, and the silica particle 12 appears to conform generally to the spherical particle of FIG. 1A, although of a somewhat large diameter. FIG. 1D shows a corresponding "donut-type" or toroidal configuration in which the central bore does not extend completely through the catalyst particle 16 but instead forms a pronounced depression 17 so that when viewed from the side of the depression the silica particle is still reminiscent of a "donut-type" configuration.

The supported metallocenes used in the present invention can be prepared by any suitable technique. Procedures known in the prior art for preparing silica-supported metallocene catalysts can be used in preparing the supported metallocenes of the present invention with the exception that the support takes the form of spheroidal silica particles having the characteristics called for in the present invention. Thus, procedures such as those disclosed in the aforementioned U.S. Pat. No. 5,308,811 to Suga et al and U.S. Pat. No. 5,444,134 to Matsumoto et al may be employed in forming the supported catalysts of the present invention with the exception of the surface area and pore size criteria specified in these references. In employing the procedures of this nature, the catalyst components, i.e., the organo aluminum compound, and the silica support can be mixed together in any order or contacted simultaneously as disclosed, for example, in the Suga et al and Matsumoto references. For a further description of such procedures, reference is made to U.S. Pat. Nos. 5,308,811 to Suga et al and 5,444,134 to Matsumoto et al, the entire disclosures which are incorporated herein by reference.

Preferably where a so-called neutral metallocene is employed it is desirable to first treat the silica support material with an alkylalumoxane co-catalyst such as methylalumoxane (MAO) with subsequent contact of alumoxane treated support with the metallocene. Subsequent to contact of the silica support with the alumoxane and metallocene, a co-catalyst such as triethylaluminum or triisobutylaluminum (TIBAL) can be added to the silica-supported catalyst and the catalyst then used in the polymerization reaction.

In experimental work carried out respecting the present invention, a syndiospecific metallocene catalyst, diphenylmethylene(cyclopentadienyl fluorenyl)zirconium dichloride, was used in the polymerization of propylene as a homogeneous catalyst and as a supported catalyst on four different silica supports. In each case, methylalumoxane (MAO) was used as the co-catalyst component ionizing agent, and TIBAL was used as a co-catalyst scavenging agent.

Figure 2:
FIG. 2 is a photograph of angular catalyst particles of a configuration used in the prior art to support metallocene catalysts.

Four silica supports were used in experimental work respecting the invention. The first, denominated herein as Support A, was an amorphous silica of irregular angular particles of an average particle size of about 35–40 microns with a surface area of about 470 m$^2$/g. and a pore volume of about 0.73 milliliters per gram. A photograph of particles of Support A, shown to an enlargement of 100×, is illustrated in FIG. 2.

The second amorphous angular silica support, denominated herein as Support B, Q-10, had a somewhat smaller average particle size of about 25 microns. This catalyst had a surface area of about 300 m$^2$/g. and a pore volume of about 1.0 ml/g. Two silica supports of the type used in carrying out the present invention were also used in the experimental work. The first, Catalyst C, was a highly spherical catalyst (without the toroidal configuration) of the type depicted in the photographs of FIG. 1A. This catalyst had an average particle size of 12 microns, a surface area of about 760 $^2$ m/g and a pore volume of about 0.9 ml/g. The fourth catalyst, Catalyst D, was a spheroidal silica having the toroidal configuration as shown in FIGS. 1B and 1C. This support had a larger average particle size and a correspondingly lower surface area than the silica having the more nearly-perfect spheroidal configuration, as exemplified by Catalyst C. Silica Support D had an average particle size of 25 microns, a surface area of about 300 m$^2$/g. and a pore volume of 1.37 ml/g.

Figure 3:
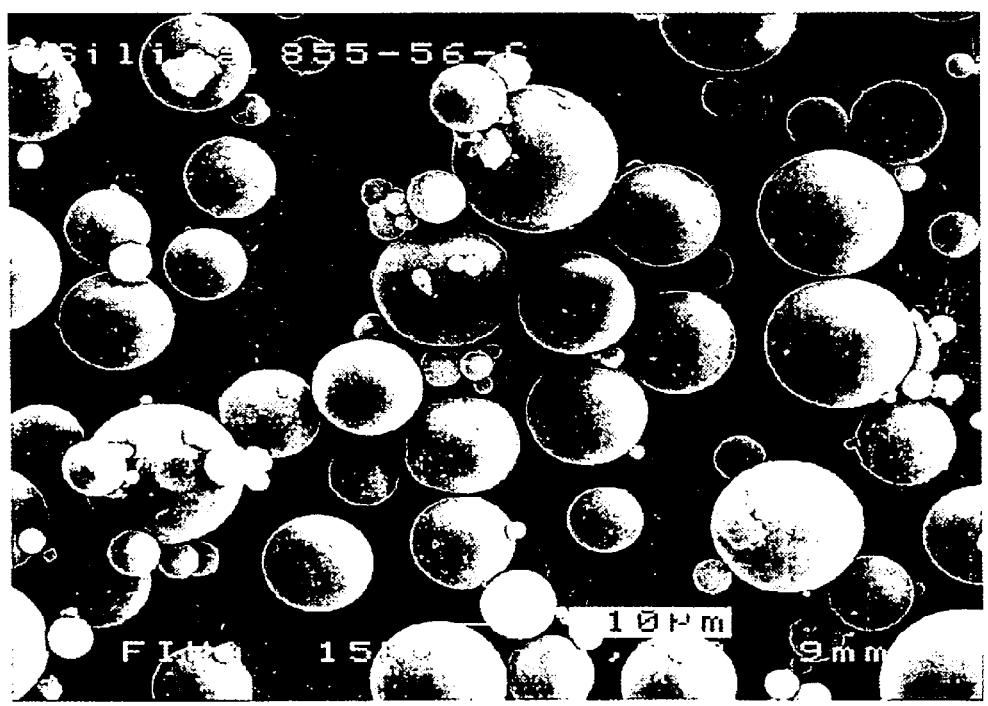
FIGS. 3 and 4 are photographs of spheroidal catalyst particles generally conforming to the catalyst particle ideally depicted in FIG. 1A.
Figure 4:
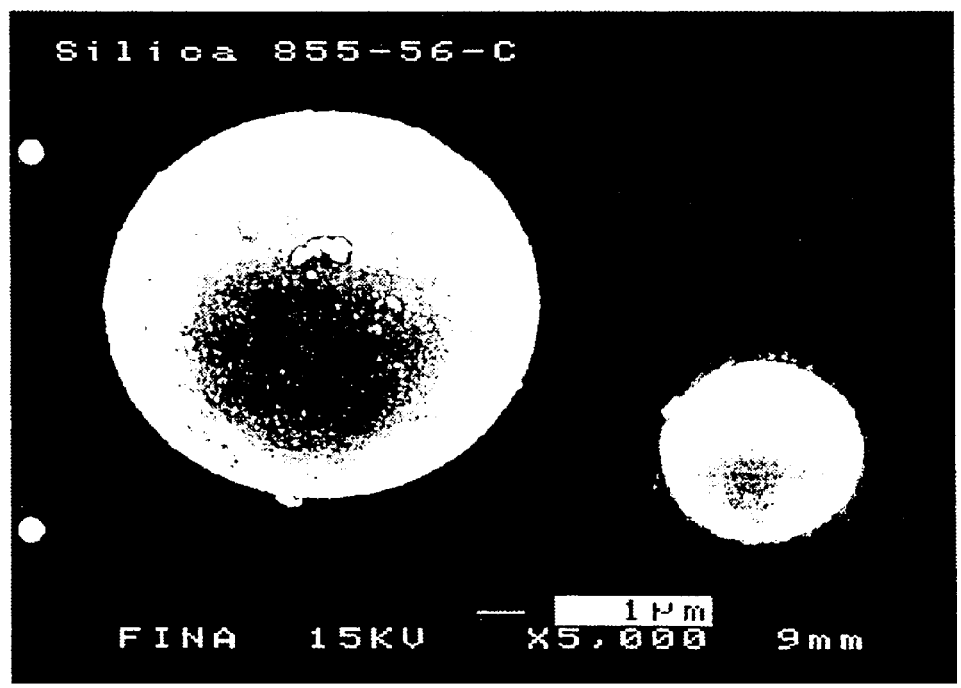

Actual photographs of silica particles corresponding generally to the idealized configurations of FIGS. 1A–1D are shown in FIGS. 3–7. As shown in FIGS. 3 and 4, the silica particles conforming to Support C are, in fact, very nearly conformed to almost perfect spheres having in some cases minor imperfections on the outer surface as shown in FIG. 4 and in other cases being relatively free of such imperfections. The silica particles are shown in FIG. 3 with a magnification of 1000 and in FIG. 4 with magnifications of 5,000.

Figure 5:
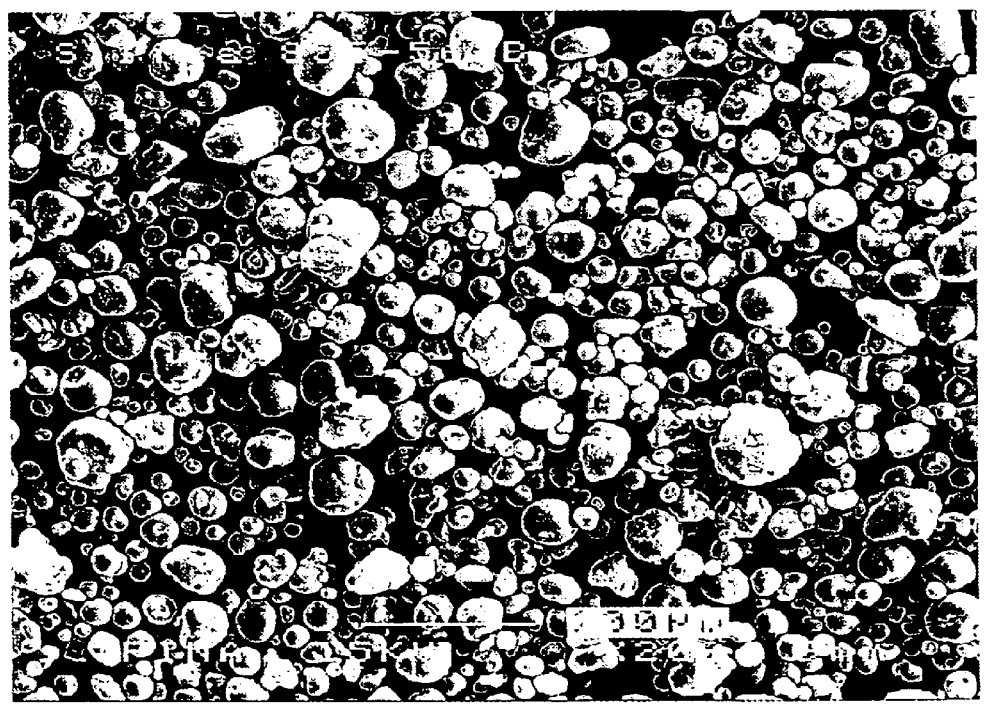
FIGS. 5, 6, and 7 are photographs of catalyst support particles generally conforming to the support particles ideally depicted in FIGS. 1B through 1D.
Figure 6:
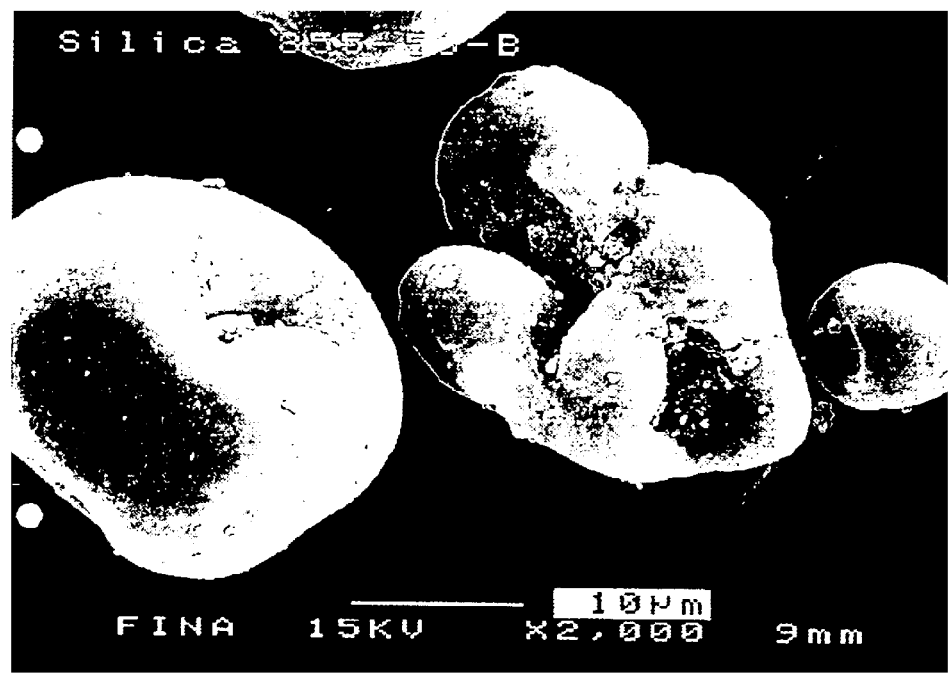
Figure 7:

Photographs of silica particles of Support D are shown in FIG. 5 at a magnification of 100, FIG. 6 (magnification 2000), and FIG. 7 (magnification 3,000). As shown in FIG. 5 and also in more detail in FIG. 6, the silica particles of Support D conform in some cases to nearly perfect spheres (with the central-recessed or bore toroidal configuration) to highly irregular configurations which tend to be, in some cases, ellipsoidal and highly fragmented. FIG. 7 shows silica particles of Support D which generally are of a spheroidal configuration with only minor imperfections on the surfaces.

The four silica supports described above were treated with methylalumoxane and then treated with the metallocene catalyst. A solution of methyl alumoxane was added to the silica particles and stirred in refluxed toluene for a period of four hours at 116° C. The weight ratio of MAO to the silica support was in each case within the range of about 0.7–0.9. The MAO-treated silica was then recovered from the toluene solution by filtering, washed three times with toluene, and dried at room temperature over night. A syndiospecific metallocene, diphenylmethylene(cyclopentadienylfluorenyl) zirconium dichloride was then added to the silica support in an amount of about 2 wt. % metallocene based upon the silica and stirred at room temperature. The solid product was then filtered and washed in hexane at room temperature.

The catalysts thus prepared were used in the polymerization of propylene to produce syndiotactic polypropylene. The four polymers thus produced are designated herein as Polymers A, B, C, and D corresponding to the catalyst as supported on Metallocene Supports A, B, C, and D. Thus, Polymer A was prepared using the syndiospecific metallocene supported on Silica Support A, Polymer B with the same metallocene on silica support B and so on. The four polymers produced had similar syndiotacticities. Two polymers were evaluated in terms of racemic pentads (rrrr) and the total content of racemic diads in the polymer structure. For Polymer B, produced by polymerization of the diphenylmethylene(cyclopentadienyl fluorenyl) zirconium chloride supported on Silica B, the polymer structure was characterized by 81.6% racemic pentads and 93.5% racemic diads. The activity of the catalyst supported on Support B was 3,369 grams per gram per hour. The catalyst supported on the preferred Support D had a much higher activity, 16,880 grams per gram per hour. Polymer D was characterized by 80.40% racemic pentads and 93.1% racemic diads.

The Polymers A through D were then used to prepare cast films by processing of pellet or powder samples of the polymer by means of a screw extruder and a t-die. Each polymer was extruded at a temperature of about 230° C. in the feed zone, and a temperature of about 250° C. in the compression die zone. The film was formed at a cast roll temperature of 30° C. to a thickness of 50 microns.

The gel imperfections, commonly termed "fish-eyes," were observed under the naked eye and with the aid of a microscope to classify the fish-eyes into four levels by length. Level A characterized by a length of 300 microns or more; Level B with fish-eye lengths within the range of 200–300 microns; Level C1 ranging from 100–200 microns and Level C2, less than 100 microns. The films were then characterized to identify gel imperfections of a size less than 200 microns. The results of the films formed from the four polymers A–D in terms of gel imperfections per area unit of 600 square centimeters are set forth in Table I:

TABLE I

| Silica Support Type | Avg. Particle Size, Microns | Gel SiO$_2$ Particles <200 Microns |
| --- | --- | --- |
| A | 38 | 3000 |
| B | 25 | 3000 |
| C | 12 | 1500 |
| D | 25 | 45 |

As can be seen from an examination of Table I, the sydiotactic polypropylene produced with metallocenes supported on Support C showed gel imperfections at a rate of about one-half of those produced for metallocenes supported on the conventional granular support. For the syndiospecific metallocene supported on Support D, the decrease in gel imperfections was remarkable, close to less than 2% of the gel imperfections observed for the conventional silica supports.

Having described specific embodiments of the present invention, it will be understood that modifications thereof may be suggested to those skilled in the art, and it is intended to cover all such modifications as fall within the scope of the appended claims.

What is claimed is:

1. In a method for the stereotactic propagation of a polymer chain derived from an ethylenically unsaturated monomer, the steps comprising:

a) providing a supported metallocene catalyst comprising a stereospecific metallocene catalyst component and an aluminum containing a co-catalyst component comprising at least one of an alkyl alumoxane and an alkylaluminum compound, said stereospecific metallocene incorporating a metallocene ligand structure having two sterically dissimilar cyclopentadienyl ring structures coordinated with a central transition metal atom; at least one of said cyclopentadienyl ring structures being a substituted cyclopentadienyl group which provides an orientation with respect to said transition metal atom which is sterically different from the orientation of the other cyclopentadienyl group with respect to said transition metal atom, and both of said cyclopentadienyl groups being in a relationship with each other providing a stereorigid relationship relative to said coordinating transition metal atom to prevent rotation of said ring structures, said metallocene catalyst component and said co-catalyst component being supported on a particulate silica support comprising spheroidal silica particles having an average diameter within the range of 5–40 microns and an average effective pore size within the range of 50–350 angstroms and containing at least 50 wt. % of the supported catalyst component within the pore volume of said particulate silica support; and b) contacting said catalyst in a polymerization reaction zone with an ethylenically unsaturated monomer which contains 3 or more carbon atoms or which is a substituted vinyl compound and maintaining said reaction zone under polymerization conditions to produce stereospecific polymerization of said monomer with an attendant rupturing of said silica support to produce secondary silica support particles having an average particle size of no more than 12 microns.

2. The method of claim 1 wherein the contact of said catalyst to produce stereospecific polymerization of said monomer is accompanied with an attendant rupturing of said silica support to produce secondary silica support particles having an average particle size of about 5 microns or less.

3. The method of claim 1 wherein said particulate silica support comprises spheroidal silica particles at least some of which comprise a central bore extending at least partially through said particle to provide a donut-type configuration.

4. The method of claim 1 wherein the transition metal of said metallocene is titanium, zirconium, hafnium, or vanadium.

5. The method of claim 1 wherein said ethylenically unsaturated monomer is a vinyl aromatic compound.

6. The method of claim 1 wherein said ethylenically unsaturated monomer is a $C_3$–$C_4$ alpha olefin.

7. The method of claim 1 wherein said $C_3$–$C_4$ alpha olefin is propylene.

8. The method of claim 1 wherein said metallocene is a chiral stereorigid metallocene characterized by the formula:

$$R''(C_5(R')_4)_2MeQp$$

wherein each $(C_5(R')_4)$ is a substituted cyclopentadienyl ring; each R' is the same or different and is a hydrogen or hydrocarbyl radical having 1–20 carbon atoms; R'' is a structural bridge between the two $(C_5(R')_4)$ rings imparting stereorigidity to said catalyst with the two $(C_5(R')_4)$ rings being in a racemic configuration relative to Me, and R'' is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal as designated in the Periodic Table of Elements; each Q is a hydrocarbyl radical having 1–20 carbon atoms or is a halogen; and $0 \leq p \leq 3$.

9. The method of claim 8 wherein said ethylenically unsaturated monomer is a $C_3$–$C_4$ alpha olefin.

10. The method of claim 9 wherein the transition metal of said metallocene is titanium, zirconium, hafnium, or vanadium.

11. The process of claim 1 wherein said metallocene is characterized by the formula:

$$R''(Cp_aR_n)(Cp_bR'_m)MeQ_p$$

wherein $Cp_a$ is a substituted cyclopentadienyl ring, $Cp_b$ is an unsubstituted or substituted cyclopentadienyl ring; each R is the same or different and is a hydrocarbyl radical having 1–20 carbon atoms; each $R'_m$ is the same or different and is a hydrocarbyl radical having 1–20 carbon atoms; R'' is a structural bridge between the cyclopentadienyl rings imparting stereorigidity to the catalyst and is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal from the Periodic Table of Elements; each Q is a hydrocarbyl radical having 1–20 carbon atoms or is a halogen; $0 \leq p \leq 3$; $0 \leq m \leq 4$; $1 \leq n \leq 4$; and wherein $R'_m$ is selected such that $(Cp_bR'_m)$ is a sterically different ring than $(Cp_aR_n)$.

12. The process of claim 11 wherein R is selected such that $(Cp_aR_n)$ forms a substituted or unsubstituted fluorenyl group.

13. The process of claim 12 wherein Me is titanium, zirconium, hafnium, or vanadium.

14. The process of claim 13 wherein R'' is a methylene, ethylene, organosilyl, substituted methylene, or substituted ethylene radical.

15. The process of claim 14 wherein $R''(CpR_n)(CpR'_m)$ forms an isopropylidene(cyclopentadienyl-1-fluorenyl) radical or a diphenylmethylene(cyclopentadienyl-1-fluorenyl) radical.

16. The process of claim 13 wherein R is selected such that $(Cp_aR_n)$ forms a substituted fluorenyl radical having bilateral symmetry and $R_n$ is selected such that $(Cp_bR_m)$ forms an alkyl substituted or unsubstituted cyclopentadienyl radical having bilateral symmetry.

17. The process of claim 16 wherein R" is a methylene, ethylene, organo methylene, or organo silyl radical.

18. The process of claim 1 wherein $R''(CpR_n)(CpR''_m)$ forms an isopropylidene(cyclopentadienyl-1-fluorenyl) radical or a diphenyl methylene(cyclopentadienyl-1-fluorenyl).

* * * * *